(12) United States Patent
Förster

(10) Patent No.: US 9,310,810 B2
(45) Date of Patent: Apr. 12, 2016

(54) ADJUSTABLE DAMPING VALVE DEVICE

(75) Inventor: Andreas Förster, Schweinfurt (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 295 days.

(21) Appl. No.: 13/993,748

(22) PCT Filed: Nov. 18, 2011

(86) PCT No.: PCT/EP2011/070437
§ 371 (c)(1),
(2), (4) Date: Jun. 13, 2013

(87) PCT Pub. No.: WO2012/079908
PCT Pub. Date: Jun. 21, 2012

(65) Prior Publication Data
US 2013/0263943 A1    Oct. 10, 2013

(30) Foreign Application Priority Data
Dec. 17, 2010  (DE) .......................... 10 2010 063 386

(51) Int. Cl.
| F16F 9/14 | (2006.01) |
| G05D 16/04 | (2006.01) |
| F16F 9/34 | (2006.01) |
| F16F 15/023 | (2006.01) |
| F16F 15/03 | (2006.01) |
| F16F 9/46 | (2006.01) |

(52) U.S. Cl.
CPC *G05D 16/04* (2013.01); *F16F 9/14* (2013.01); *F16F 9/34* (2013.01); *F16F 9/464* (2013.01); *F16F 15/023* (2013.01); *F16F 15/03* (2013.01); *F16F 2222/06* (2013.01); *F16F 2222/12* (2013.01); *F16F 2230/24* (2013.01); *Y10T 137/7793* (2015.04)

(58) Field of Classification Search
CPC ............. F16F 9/46; F16F 9/464; F16F 9/465; F16F 2230/24; F16F 5/00; F16F 6/00; F16F 7/00; F16F 9/00; F16F 9/14; F16F 9/34; F16F 15/02; F16F 15/023; F16F 15/03; F16F 2222/06; F16F 2222/12; B60G 17/06; B60G 17/08; F16K 31/0655; F16K 17/06; Y10T 137/7793; G05D 16/04
USPC ................. 188/322.13, 322.15, 282.1, 282.2, 188/282.8; 181/322.13, 322.15, 282.1, 181/282.2, 282.8; 267/140.14, 140.15
See application file for complete search history.

(56) References Cited

U.S. PATENT DOCUMENTS

| 5,303,804 | A | * | 4/1994 | Spiess ........................ 188/266.5 |
| 5,464,079 | A | * | 11/1995 | Lohberg et al. ............... 188/315 |
| 5,850,896 | A | * | 12/1998 | Tanaka ........................ 188/266.2 |
| 2010/0252766 | A1 | * | 10/2010 | Forster ...................... 251/129.15 |
| 2013/0015028 | A1 | * | 1/2013 | Heyn et al. ............... 188/322.13 |
| 2013/0248021 | A1 | * | 9/2013 | Forster .......................... 137/529 |
| 2013/0340865 | A1 | * | 12/2013 | Manger et al. ............ 137/561 R |

* cited by examiner

Primary Examiner — William McCalister
Assistant Examiner — Ian Paquette
(74) Attorney, Agent, or Firm — Cozen O'Connor

(57) ABSTRACT

An adjustable damping valve device (27), in particular for a vibration damper, comprises a first valve (47) and an emergency operation valve (61), both of which are actuated by magnetic force. The emergency operation has a valve body (61) which is preloaded in a closed position by at least one valve spring. A pressure-relief valve (85) is connected hydraulically in parallel with the emergency operation valve (61) so that the damping force is determined by the pressure-relief valve (85) when the emergency operation valve (61) is closed. The pressure-relief valve (85) is arranged in the valve body (63) of the emergency operation valve.

5 Claims, 2 Drawing Sheets

ADJUSTABLE DAMPING VALVE DEVICE

PRIORITY CLAIM

This is a U.S. national stage of application No. PCT/EP2011/070437, filed on Nov. 18, 2011. Priority is claimed on the following applications: Country: Germany, Application No.: 10 2010 063 386.0, Filed: Dec. 17, 2010, the content of which is incorporated herein in its entirety by reference.

FIELD OF THE INVENTION

The invention is directed to an adjustable damping valve device particularly for a vibration damper.

BACKGROUND OF THE INVENTION

Depending upon the design principle, a damping valve which is adjustable by means of magnetic force adopts a particularly soft or a particularly hard damping force characteristic in deenergized state. This effect is produced at least by a spring force against which the magnetic force must act. In case of outage of the magnetic force, e.g., due to cable breakage, the spring force then displaces a valve body into an end position. Assuming that a high damping force also represents high safety reserves for the chassis of a vehicle, then the basic operating principle is advantageous, since the safety device for the adjustable damping valve already exists in practice without further expenditure.

However, it is already known from U.S. Pat. No. 5,413,196 or U.S. Pat. No. 5,085,299 A1 that it is not necessarily the hardest damping force setting that is sought as an emergency operation characteristic, but rather a moderate damping force characteristic. In U.S. Pat. No. 5,413,196, FIG. 2 shows an adjustable damping valve device which comprises an auxiliary valve device and a main stage valve. The damping force of the damping valve device is adjusted through the flow-off of damping medium from a control space of the main stage valve.

The auxiliary valve device comprises an auxiliary control valve and an emergency operation valve. The two valves are arranged in series with respect to the flow path of the damping medium from the control space (FIG. 2). Even with a small energizing current, the emergency operation valve (529a) opens and completely releases the flow-off (26i). Only cross section 26i works in the emergency operation position and therefore determines, e.g., a medium damping force setting.

In the embodiment of FIG. 6 in U.S. Pat. No. 5,413,196, the auxiliary valve device likewise comprises an emergency operation valve, which, however, is hydraulically connected in parallel to the auxiliary valve. This poses the problem that a malfunction of the emergency operation valve also affects the damping force setting of the auxiliary valve.

The construction principle in FIG. 2 and FIG. 6 presents the difficulty that the axially movable valve body of the auxiliary valve and the emergency operation valve body are in direct contact, and the emergency operation valve carries out a displacing movement on the valve body of the auxiliary valve starting from the emergency operation position into the normal operation position.

It is compulsory that the two valve bodies of the auxiliary valve device be able to move very smoothly relative to one another. This results in small annular gaps which, on the one hand, bring about internal leakage which influences the damping force adjustment and, on the other hand, impair the guiding of the valve body relative to the magnetic coil.

These difficulties can be overcome, but the expenditure on fabrication required for this purpose adds to production costs.

US/2010/252766 and DE 10 2009 002 582 A1 disclose a damping valve device having an annular valve body that releases an outlet opening even when energized only slightly. The valve body and the outlet opening form an emergency operation valve. In the event of power outage with closed emergency operation valve, the damping force is determined by a pressure-relief valve which is hydraulically connected to the emergency operation valve in parallel with the latter. In the respective constructions according to FIG. 2, the pressure-relief valve is formed by a small valve cartridge which is arranged radially in an intermediate wall of the damping valve device. However, this radial arrangement of the pressure-relief valve affects both the radial and axial installation space of the damping valve device.

It is an object of the present invention to optimize the installation space requirement of an adjustable damping valve device.

SUMMARY OF THE INVENTION

This object is met in that the pressure-relief valve is arranged in the valve body of the emergency operation valve.

An appreciable gain in radial installation space can be achieved through the arrangement in the valve body. Further, an outlet channel having a smaller diameter can be provided so that a gain in axial installation space is also achieved.

In a further advantageous embodiment, the pressure-relief valve is arranged in a receiving channel extending parallel to the movement direction of the valve body. An axial channel can be produced in a very simple manner.

A particularly great advantage is achieved with respect to installation space when a plurality of pressure-relief valves are arranged hydraulically in parallel inside the valve body. Regardless of whether an individual pressure-relief valve is used or a plurality of pressure-relief valves are used, the installation space requirement does not change.

According to an advantageous embodiment, the emergency operation valve is constructed as a seat valve, wherein a pressure compensation channel of the valve body of the emergency operation valve is separated radially by a valve seat surface from an exit orifice of the pressure-relief valve. Therefore, the pressure-impinged surface in closing direction of the valve body is greater than the pressure-impinged surface in the lift direction. Consequently, the closing position of the emergency operation valve is hydraulically assisted.

A further advantage with respect to installation space and a simple design of the valve body is achieved in that the inflow into the pressure-relief valve takes place via the pressure compensation channel of the valve body.

The guidance of flow in the damping valve device is facilitated in that the emergency operation valve and the at least one pressure-relief valve are connected to a common flow-off opening.

BRIEF DESCRIPTION OF THE DRAWINGS

The invention will be described in more detail with reference to the following drawings in which.

DETAILED DESCRIPTION OF THE PRESENTLY PREFERRED EMBODIMENTS

Figure 1:
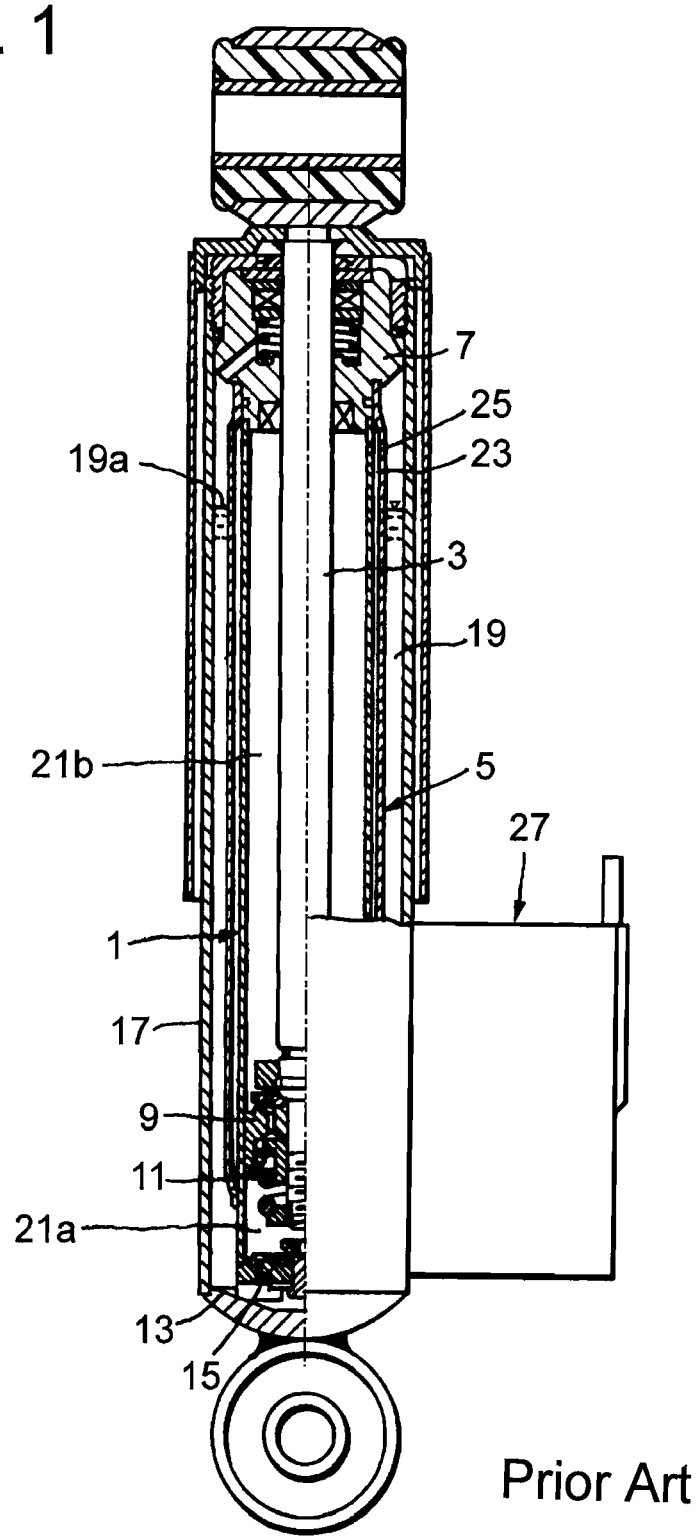
FIG. 1 is a partial cross-sectional view of a known vibration damper with a damping valve device.

In FIG. 1, a vibration damper has a cylinder 1 in which a piston rod 3 is arranged so as to be axially movable. A guiding and sealing unit 7 guides the piston rod 3 out of the upper end of the cylinder. A piston unit 9 with a piston valve arrangement 11 is fastened to the piston rod 3 inside the cylinder 1. The bottom end of the cylinder 1 is closed by a base plate 13 with a bottom valve arrangement 15. The cylinder 1 is enclosed by a reservoir tube 17. The reservoir tube 17 and an intermediate tube 5 form an annular space 19 presenting a compensation chamber. The space within the cylinder 1 is divided by the piston unit 9 into a first working chamber 21a and a second working chamber 21b. The working chambers 21a and 21b are filled with damping fluid. The compensation chamber 19 is filled with liquid up to level 19a and, above that, with gas. A first line section, namely, a high-pressure section 23 which communicates with the second working chamber 21b via a bore 25 of cylinder 1 is formed inside the compensation chamber 19. Adjoining this high-pressure section is an adjustable damping valve device 27 which is fitted laterally to the reservoir tube 17. A second line section, namely, a low-pressure section 29, leads from the adjustable damping valve device 27 into the compensation chamber 19.

When the piston rod 3 moves upward out of the cylinder 1, the upper working chamber 21b becomes smaller. An overpressure builds up in the upper working chamber 21b, which overpressure can only be decreased by the piston valve arrangement 11 in the lower working chamber 21a as long as the adjustable damping valve 27 is closed. When the adjustable damping valve 27 is opened, fluid flows simultaneously from the upper working chamber 21b through the high-pressure section 23 and the adjustable damping valve 27 into the compensation chamber 19. Accordingly, when the piston rod 3 moves out, the damping characteristic of the vibration damper depends on the degree to which the adjustable damping valve 27 is open or closed.

When the piston rod 3 moves into the cylinder 1, an overpressure forms in the lower working chamber 21a. Fluid can pass upward from the lower working chamber 21a through the piston valve arrangement 11 into the upper working chamber 21b. The fluid displaced by the increasing piston rod volume within the cylinder 1 is expelled through the bottom valve arrangement 15 into the compensation chamber 19. An increasing pressure also occurs in the upper working chamber 21b because the flow resistance of the piston valve arrangement 11 is less than the flow resistance of the bottom valve arrangement 15. This increasing pressure can again flow through the high-pressure section 23 into the compensation space 19 when the damping valve 27 is opened. This means that when the damping valve 27 is opened the shock absorber also has a softer characteristic when moving in when the adjustable damping valve 27 is open and a harder characteristic when the damping valve 27 is closed, just as when the piston rod moves out. It should be noted that the flow direction through the high-pressure section 23 of the bypass is always the same regardless of whether the piston rod moves in or out.

Figure 2:
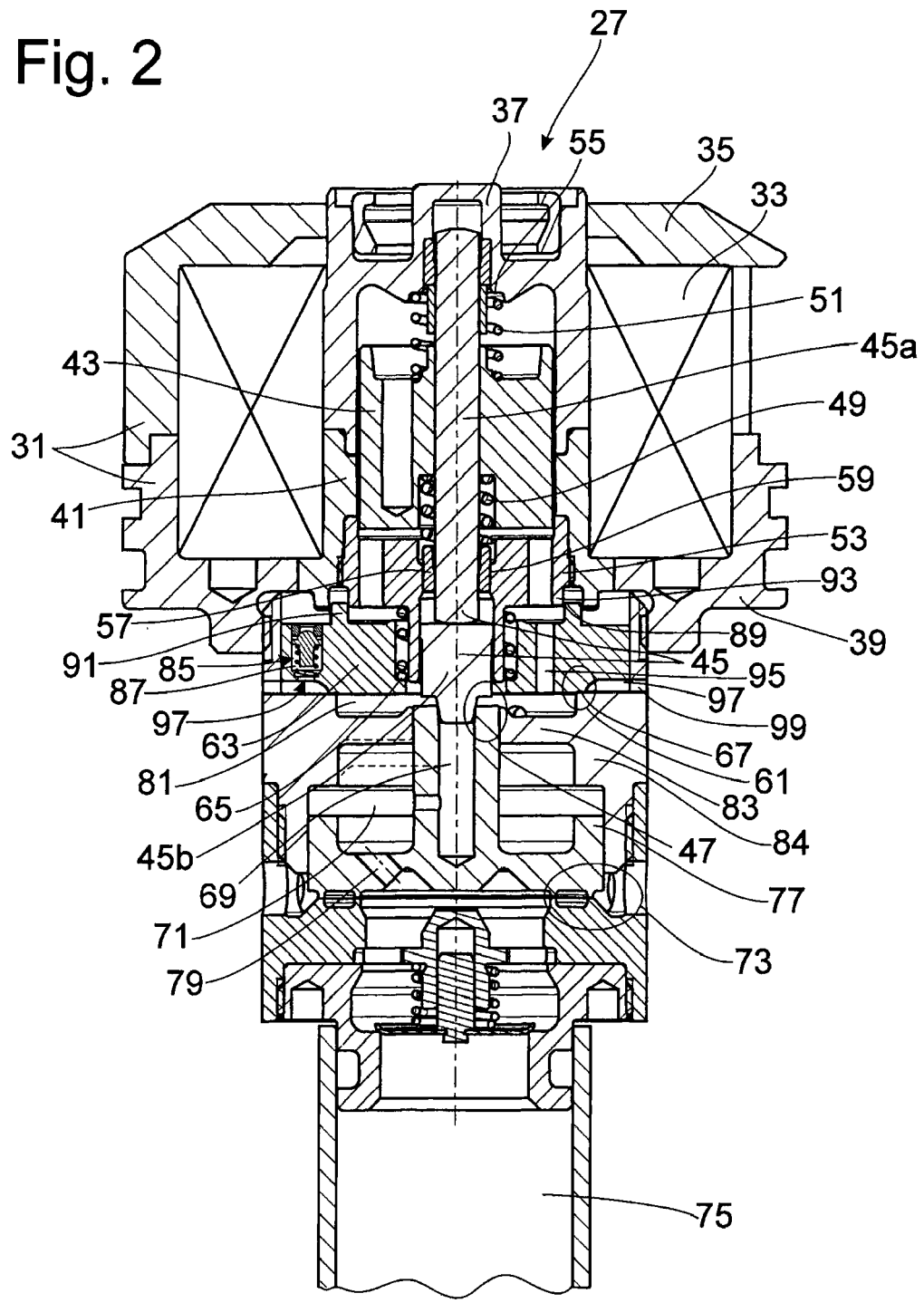
FIG. 2 is a cross-sectional view of the damping valve device in accordance with the present invention with the first valve and emergency operation valve arranged in series.

FIG. 2 shows the damping valve device 27 in a housing 31 which is fastened externally to the reservoir tube 17 or inside the cylinder 1, e.g., to the piston rod 3. An annular magnetic coil 33 is arranged in the housing 31. An opening of a housing cover 35 is closed by a return path sleeve 37 with a base. An insulator 41 for insulating the magnetic coil 33 from the magnetic flux is arranged between a bottom housing part 39 and the back iron sleeve 37.

Inside the back iron sleeve 37, a valve armature 43 together with a valve body 45 of a first valve 47 is supported in an axially floating manner against the force of a spring assembly acting on both sides of the valve armature 43 and accordingly also on both sides of the valve body 45. The spring assembly comprises, per side, at least one spring 49 acting in the direction opposite to the spring 51 on the other side of the valve armature 43. A magnetic flux guiding element 53 which has only a small magnetic flux resistance, i.e., has good magnetic conductivity, is fixed to the bottom housing part 39.

The valve body 45 of the first valve 47 is supported in the base of the back iron sleeve 37 on one hand and in the magnetic flux guiding element 53 on the other hand. A first spring collar 55 for the at least one spring 51 is formed by the back iron sleeve 37. A second spring collar 57 engages in a through-opening 59 of the magnetic flux guiding element 53 through which the valve body 45 of the first valve element 47 also extends. The second spring collar 57 is accessible through the through-opening 59 and forms an interference fit. This makes it possible for the second spring collar 59 to be axially displaceable within limits when the magnetic flux guiding element 53 is already installed, so that the spring assembly 49; 51 can be re-tensioned. Manufacturing tolerances, if any, can be compensated by the re-tensioning.

An emergency operation valve 61 is arranged in series with the first valve 47 in the housing 31 with respect to the flow direction. The magnetic flux guiding element 53 is arranged between the two valves 47; 61. A valve body 63 of the emergency operation valve 61 is constructed annularly and is arranged concentric to the valve body 45 of the first valve 47. A preloading spring 65 which is supported at the magnetic flux guiding element 53 tensions the valve body 63 of the emergency operation valve 61 on a valve seat surface 67 of the housing 84. This emergency operation valve 61 is constructed as a seat valve.

The valve body 45 of the first valve 47 is formed of multiple parts in its movement direction. At least two length portions 45a; 45b of the valve body 45 can execute an angular movement relative to one another. Length portion 45b is supported inside the through-opening 59 of the magnetic flux guiding element 53 so as to be movable angularly and is moved at the front by the length portion 45a which is connected to the valve armature 43.

The second length portion 45b of the first valve 47 acts on a flow-off opening 69 of a control space 71 of a main stage valve 73 controlled by the first valve 47. The main stage valve 73 is connected to a work space 21a; 21b of the vibration damper via a connection piece 75. The damping medium exerts a lifting force on a main stage valve body 77 that opposes a closing force of the first valve 47. In addition, a pressure of the damping medium in the control space 71 connected to the connection piece 75 by a connection opening 79 in the main stage valve 73 exerts a closing force on the main stage valve body 77. Depending upon the hold-down force of the first valve 47 on the flow-off opening 69 of the main stage valve 73, the main stage valve body 77 is lifted from its valve seat surface so that the damping medium can flow off radially into a compensation space 19 or a work space of the vibration damper via the valve seat.

The hold-down force of the first valve 47 is determined by the energization through the magnetic coil 33. A large energization leads to a high hold-down force, and there is minimum hold-down force in the deenergized state. In particular, at the lowest energization, the damping medium can flow into an intermediate space 81 of the housing 84 extending between an underside of the magnetic flux guiding element 53 and an upper side of an intermediate wall 83 of the housing 84 to the main stage valve 73. The flow out of this intermediate space is determined by the emergency operation valve 61. In the deenergized state, the emergency operation valve 61 is held in a closing position on the valve seat surface 67 by the preloading spring 65. With respect to the flow path of the damping medium proceeding from the connection piece 75, the first valve 47 and the emergency operation valve 61 are arranged in series.

A pressure-relief valve 85 is hydraulically connected in parallel with the emergency operation valve 61 and is arranged in the valve body 63 of the emergency operation valve 61. The pressure-relief valve 85 is arranged in a receiving channel 87 extending parallel to the movement direction of the valve body 63.

If required, a plurality of pressure-relief valves 85 with different opening behaviors can also be arranged hydraulically in parallel inside the valve body 63.

At least one pressure compensation channel 95 is formed inside the valve body 63 of the emergency operation valve 61. This at least one pressure compensation channel 95 of the valve body 63 of the emergency operation valve 61 is separated radially from an exit orifice 97 of the pressure-relief valve by the valve seat surface 67.

At a low energization, a magnetic flux is initiated which continues from the bottom housing part 39 radially into the valve body 63 of the emergency operation valve 61. The resistance between an edge 89 of the valve body 63 and the magnetic flux guiding element 53 is less than that between the valve seat surface 67 and the valve body 63, so that the magnetic flux exerts a lifting force on the valve body 63 in direction of the magnetic flux guiding element 53. The magnetic flux continues over the length portion of the valve body 45a of the first valve, which length portion is located in the valve armature 43, to the valve armature and to the back iron sleeve 37. The low current is not yet sufficient to move the first valve body 45 of the first valve 47 significantly in direction of the flow-off opening 69. The air gap adjusted between the valve armature 43 and the upper side of the magnetic flux guiding element 53 by the spring assembly 49, 51 is not overcome until the energization is high. When the emergency operation valve 61 is open, the magnetic resistance decreases again in the transition from the bottom housing part 39 via the valve body 63 of the emergency operation valve 61 to the magnetic flux guiding element 53, since the radial overlapping between a circumferential web 91 of the valve body 63 of the emergency operation valve 61 and a shoulder 93 at the magnetic flux guiding element 53 increases with the lifting movement of the emergency operation valve 61.

When there is no current applied to the magnetic coil 33 and the emergency operation valve 61 is closed, the inflow to the pressure-relief valve 85 takes place via the pressure compensation channel 95 of the valve body. The emergency operation valve 61 and the at least one pressure-relief valve 85 are connected to a common flow-off opening 99. A radial flow connection, not shown, which allows damping medium to flow in the direction of the pressure-relief valve 85 even when the emergency operation valve 61 is closed is formed in the web 91. The damping medium can flow out of the intermediate space 81 via the pressure compensation channel 95 and the at least one opened pressure-relief valve 85 into the flow-off opening 99 and, depending on the construction of the vibration damper, into a compensation space or a work space. A closing pressure determining the damping force of the damping valve device develops in the control space 71 depending on the valve characteristic of the at least one pressure-relief valve 85.

The possible shape of the intermediate wall 83 is shown in dashed lines in the left-hand section area of the housing 84 to better illustrate the advantage with respect to possible axial installation space compared to the prior art.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:

1. An adjustable damping valve device for a vibration damper comprising:
   a main stage valve (73);
   a first valve (47) and an emergency operation valve (61), both said first valve and said emergency valve being actuated by magnetic force, said the emergency operation valve (61) comprising an axially moveable valve body (63) preloaded in a closed position by at least one valve spring; a pressure relief valve (85) connected hydraulically in parallel with said emergency operation valve (61) so that a damping force is determined by said pressure-relief valve (85) when said emergency operation valve (61) is closed, said pressure-relief valve (85) being arranged in said axially moveable valve body (63) of said emergency operation valve (61); wherein said main stage valve (73) is controlled by said first valve (47); and said emergency valve (61) is arranged hydraulically in series with said first valve (47).

2. The adjustable damping valve device according to claim 1, wherein said pressure-relief valve (85) is arranged in a receiving channel (87) extending parallel to the movement direction of said valve body (63).

3. The adjustable damping valve device according to claim 1, additionally comprising a common flow-off opening (99); and wherein said emergency operation valve (61) and said pressure-relief valve (85) is connected to said common flow-off opening (99).

4. The adjustable damping valve device according to claim 1, additionally comprising a pressure compensation channel (95) within said valve body (63) of said emergency valve (61); a valve seat surface (67) and an exit orifice (97) for said pressure-relief valve (95) within said emergency valve (61); wherein said emergency operation valve (61) is constructed as a seat valve; and wherein said pressure compensation channel (95) of said valve body (63) of said emergency operation valve (61) is separated radially by said valve seat surface (67) from said exit orifice (97) of said pressure-relief valve (85).

5. The adjustable damping valve device according to claim 4, wherein an inflow to said pressure-relief valve (85) takes place via said pressure compensation channel (95) of said valve body (63).

* * * * *